United States Patent [19]

Yamauchi et al.

[11] Patent Number: 5,527,505

[45] Date of Patent: Jun. 18, 1996

[54] PROCESS FOR THE MANUFACTURE OF FERMENTED MILK

[75] Inventors: Yoshihiko Yamauchi, Sapporo; Satoshi Ishii, Hiroshima; Shuji Toyoda; Kenkichi Ahiko, both of Sapporo, all of Japan

[73] Assignee: Snow Brand Milk Products Co., Ltd., Japan

[21] Appl. No.: 232,467

[22] Filed: Apr. 22, 1994

Related U.S. Application Data

[63] Continuation of Ser. No. 851,556, Mar. 13, 1992, abandoned.

[30] Foreign Application Priority Data

Mar. 18, 1991 [JP] Japan .................................. 3-078462

[51] Int. Cl.$^6$ .................................................. A23C 9/12
[52] U.S. Cl. .............................. 420/42; 426/34; 426/43; 426/124; 426/128
[58] Field of Search ........................ 426/34, 42, 43, 426/124, 128

[56] References Cited

U.S. PATENT DOCUMENTS

| | | | |
|---|---|---|---|
| 4,740,593 | 4/1988 | Gonzalez et al. | 435/243 |
| 5,043,176 | 8/1991 | Bycroft et al. | 426/335 |

OTHER PUBLICATIONS

Gupta et al., 90:6183 FSTA DN 90-05-P0094, abstract Microbiologie–Aliments–Nutrition, (1989) 7(2), 123–129.
Hylmar, 84:1014 FSTA DN 84–01–P0024 abstract only, Prumysl Potravin, (1983) 34(2) 92–93.
Pokorna, 81:1183 FSTA DN 81–08–P1471, abstract only, Prumysl Potravin, (1980) 31(10) 564–565.
Indian Journal of Dairy Science, vol. 28, No. 1, 1975, pp. 71–72; M. S. Kalra et al.: "Stoppage in Increase in Acid Production of Yogurt by Incorporating A Nisin–Producing Culture".
Food Science & Technology Abstracts, No. 76–09–P1739 (76052152); M. S. Kalra et al.: "Effect of Nisin–Producing Strains on the Activity of Some Common Starter Common Starter Cultures" *Abstract only.
Journal of Dairy Science, vol. 34, 1951, pp. 1136–1144; L. E. Baribo et al; "The Production of a Growth Inhibitor by Lactic Streptococci".
Journal of Dairy Science, vol. 60, No. 5, 1977, pp. 815–821; F. J. Babel; "Antibios by Lactic Culture Bacteria".

*Primary Examiner*—Helen Pratt
*Attorney, Agent, or Firm*—Whitham, Curtis, Whitham, & McGinn

[57] ABSTRACT

Fermented milk with a controlled acidity increase during storage and transportation is disclosed. The fermented milk can be manufactured by inoculating raw milk with a nisin-producing lactic acid bacterium belonging to the genus *Lactococcus lactis* subsp. *lactis* together with other lactic acid bacteria to be used for the fermentation and fermenting the raw milk. Nisin produced and accumulated in the fermented milk suppresses the growth of bacteria which are involved in the formation of acids, thus controlling the acidity increase during storage and transportation.

2 Claims, No Drawings

PROCESS FOR THE MANUFACTURE OF FERMENTED MILK

This application is a continuation of Ser. No. 07/851,556 filed Mar. 13, 1992 now abandoned.

BACKGROUND OF THE INVENTION

1. Field of the Invention

The present invention relates to fermented milk exhibiting a controlled increase in the acidity during storage and transportation and containing lactobacilli and lactococci at a specific ideal ratio, and to a process for manufacturing such fermented milk.

2. Description of the Background Art

Antibacterial substances produced by lactic acid bacteria, typified by nisin produced by *Lactococcus lactis* subsp. *lactis*, formerly called *Streptococcus lactis* subsp. *lactis*, are used for the purposes of promoting a storage performance of foods and preventing quality of foods from being deteriorated due to proliferation of bacteria in the foods and contamination thereof.

It is very difficult to retain through the entire period of storage and transportation favorable flavor possessed by fermented foods immediately after the production, e.g., fresh flavor of fermented milk, in which living bacteria are present. Yogurt, for example, which is characterized by its containment of living bacteria, possesses an inherent defect of its flavor change due to the increase in acidity during storage and transportation. A number of trials have been undertaken for preventing the acidity of yogurt from being increased during storage. All of them, however, brought about only insufficient results; some exhibited only poor effects of preventing the acidity increase, others required very complicated manufacturing processes, and many of them involved high production costs.

As mentioned above, living bacteria contained in fermented food products, such as yogurt, proliferate during the storage and increase the acidity of the products, leading to deterioration of the flavor.

Development of a process for preventing such deterioration of flavor in fermented food products by suppressing activities of bacteria, which is a cause of such flavor deterioration, by a simple method without altering conventional process steps has been desired.

Among major bacteria used for fermentation of raw milk at the start of yogurt production, *Lactobacillus delbrueckii* subsp. *bulgaricus* and *Streptococcus salivarius* subsp. *thermophilus*, the former is the cause of the acidity increase at least in the storage and transportation period. Controlling the growth of *Lactobacillus delbrueckii* subsp. *bulgaricus* to directly inhibit the acidity formation of the bacteria during the storage, therefore, contributes to the prevention of the acidity increase in the product, leading to efficient prevention of the quality deterioration.

From this aspect, the present inventors have undertaken extensive studies on the mutual actions between bacteria used at the start of fermentation (such bacteria are hereinafter called "starter bacteria" or simply "starter") in manufacturing processes of fermented foods, and found that the growth of starter bacteria in the raw milk is suppressed by certain bacteria of *Lactococcus lactis* subsp. *lactis*. The inventors have further studied the cause of such inhibition and found that an antibacterial agent nisin secreted by *Lactococcus lactis* subsp. *lactis* in a medium suppresses the growth of other starter bacteria and controls formation of acids. These findings have led to the completion of the present invention.

SUMMARY OF THE INVENTION

Accordingly, an object of this invention is to provide fermented milk with a controlled acidity increase during storage and transportation comprising living lactic acid bacteria and nisin produced by *Lactococcus lactis* subsp. *lactis*.

Another object of the present invention is to provide a process for the manufacture of fermented milk with a controlled acidity increase during storage and transportation which comprises: inoculating raw milk with a nisin-producing lactic acid bacterium belonging to genus *Lactococcus lactis* subsp. *lactis* together with other lactic acid bacterium and fermenting the raw milk.

In a specific, preferred embodiment of the present invention, the above nisin-producing lactic acid bacterium is *Lactococcus lactis* subsp. *lactis* ATCC11454 and the above other lactic acid bacterium is *Lactobacillus delbrueckii* subsp. *bulgaricus* or *Streptococcus salivarius* subsp. *thermophilus*, SBT 1511 (FERM BP-3762), or both.

Other and further objects, features and advantages of the present invention will appear more fully from the following description.

DETAILED DESCRIPTION OF THE INVENTION AND PREFERRED EMBODIMENTS

Nisin is a peptide-like antibacterial compound produced by certain bacteria belonging to genus *Lactococcus lactis* subsp. *lactis*, e.g., ATCC11454 strain. Its primary structure is as follows (J. Amer. Chem. Soc., 93, 4634–4635 (1971).

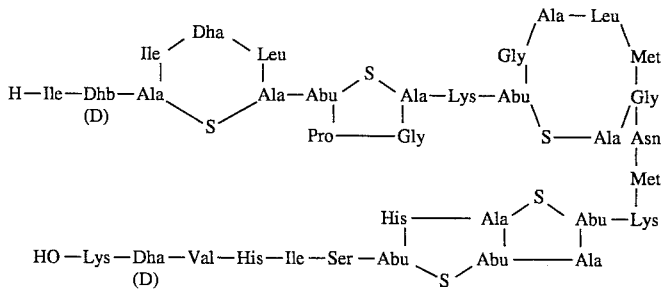

Abu = α-aminobutyric acid
Dha = dehydroalanine
Dhb = dehydrobutyrine

ATCC11454 is listed in the catalog issued by American Type Culture Collection and can be available from the institute.

This antibacterial substance has a narrow spectrum and, as described later in more detail, suppresses the growth of only Lactobacilli which are the cause of the quality deterioration, and does not suppress the growth of Lactococci.

Nisin is produced by the cultivation of a nisin-producing bacterium, such as *Lactococcus lactis* subsp. *lactis* ATCC11454, collected from the culture broth, and purified. Since it is produced by lactic acid bacteria which are used in food fermentation, nisin is a highly safe compound. In the United States, it is added to cheese for the purpose of preventing abnormal fermentation or rot of cheese. Also, for the production of cheese free from abnormal fermentation, a nisin-producing bacterium is used as a starter microorganism.

According to the present invention, the acidity increase in fermented milk products can be controlled by manufacturing such products using, as starter bacteria, a nisin-producing lactic acid bacterium belonging to genus *Lactococcus lactis* subsp. *lactis* and other lactic acid bacteria. A typical example of the nisin-producing lactic acid bacterium belonging to genus *Lactococcus lactis* subsp. *lactis* is the above-mentioned ATCC11454. This microorganism is mutable by a normal mutation treatment, e.g., by irradiation of UV rays or by a treatment with chemicals, e.g., N-methyl-N'-nitro-N-nitrosoguanidine (NTG), etc. The present invention also includes such mutants.

Examples of other lactic acid bacteria used in the present invention include *Lactobacillus delbrueckii* subsp. *bulgaricus*, *Lactobacillus helveticus* subst. *jugurti*, *Bifidobacterium breve* subst. *breve*, *Streptococcus salivarius* subsp. *thermophilus*, and the like. Among these, *Lactobacillus delbrueckii* subsp. *bulgaricus* SBT 1511 (FERM BP-3762) is particularly preferable due to its low acid-producing characteristic and the high sensitivity toward nisin. The mutants of this bacterium are also usable in the process of the present invention.

For carrying out the process of the present invention, these lactic acid bacteria are inoculated into pasteurized milk such as pasteurized skim milk and cultivated. Cultured material is used as a starter for the fermentation of milk. The starter may contain both cultivated nisin-producing bacteria and other lactic acid bacteria for the fermentation, or nisin-producing bacteria and other lactic acid bacteria may be individually cultivated to provide starters. Alternatively, all these bacteria may be directly inoculated into a fermentation raw material. The amount of these starter bacteria used for the production of fermented milk according to the present invention is 0.1–5% of the raw milk for nisin-producing bacteria and 1–3% for other lactic acid bacteria for the fermentation. Fermentation can be carried out under the same conditions as those applied to conventional milk fermentation processes.

According to the present invention, the growth of lactic acid bacteria used for the fermentation of milk can be suppressed by nisin produced by these nisin-producing bacteria, thus preventing the quality of fermented products which contain these fermentation lactic acid bacteria from being deteriorated during the storage and transportation. In particular, of the most popular starter bacteria, *Lactobacillus delbrueckii* subsp. *bulgaricus* and *Streptococcus salivarius* subsp. *thermophilus*, the bacterium is the cause of the quality deterioration of fermented products during the storage and transportation, and nisin can suppress the growth of this bacterium. Thus, nisin promotes the quality of the fermented milk by retaining the amount of these two bacteria within a suitable ratio.

Fermented milks of the present invention include hard yogurt, soft yogurt, acidophilus milk, fermented soft drinks, fermented butter milk, and the like.

Other features of the invention will become apparent in the course of the following description of the exemplary embodiments which are given for illustration of the invention and are not intended to be limiting thereof.

EXAMPLES

Example 1

To 2 kg of a yogurt mix consisting of raw milk, powdered skim milk, and sugar were added 1% of commercially available *Streptococcus salivarius* subsp. *thermophilus* and 1% of low acid-producing *Lactobacillus delbrueckii* subsp. *bulgaricus* SBT 1511 (FERM BP-3762), followed by fermentation at 42° C. for the production of a control lot of fermented milk. Other lots were prepared by inoculating, in addition to the above two bacteria, 0.1–1.0% of *Lactococcus lactis* subsp. *lactis* ATCC11454, followed by fermentation at 42° C. Acidity of each lot was measured over time to terminate the fermentation when the acidity reached 0.65%. Fermented milks thus obtained were stored at 10° C. to measure their acidity after 14 days. The results are shown in Table 1, which demonstrates that the addition of ATCC11454 remarkably controlled the acidity increase, e.g., 76% of the control by the addition of 0.3% of ATCC11454 and 49% of the control by the addition of 1.0% of ATCC11454. This test also indicated that, in the comparison of Lot No. 4 to which ATCC11454 was inoculated together with other lactic acid bacteria at the start of fermentation and Lot No. 5 to which ATCC11454 was inoculated 2.5 hours after the start of the fermentation, the former lot took a longer time to reach the acidity of 0.65% but its acidity increase was more effectively controlled during the storage.

TABLE 1

| Lot No. | ATCC11454 (%) | Fermentation time (hour) | Acidity (%) At completion of fermentation (A) | Acidity (%) After 14 day storage (B) | Acidity increase in 14 days (%) (B-A) |
| --- | --- | --- | --- | --- | --- |
| 1 | — | 3:15 | 0.642 | 1.030 | 0.388 (100%) |
| 2 | 0.1 | 3:30 | 0.647 | 1.018 | 0.371 (96%) |
| 3 | 0.3 | 3:35 | 0.651 | 0.947 | 0.296 (76%) |
| 4 | 1.0 | 6:20 | 0.637 | 0.826 | 0.189 (49%) |
| 5 | 1.0* | 5:15 | 0.647 | 0.897 | 0.250 (64%) |

* ATCC11454 was inoculated 2.5 hours after the start of fermentation.

The number of living bacteria (colony forming unit: cfu) in yogurt and changes in acidity of each lot were given in Table 2, which demonstrates that with the addition of 0.3–1.0% of ATCC11454 the number of living bacterium, *Lactobacillus delbrueckii* subsp. *bulgaricus*, was controlled to 40–53% of the control lot, while the growth of *Streptococcus salivarius* subsp. *thermophilus* was hardly affected. As a result, the proportion of Streptococcus in total living bacteria upon completion of the fermentation was 89–90%, which is ideal for the control of the acidity increase in storage.

TABLE 2

| Lot No. | ATCC11454 (%) | | cfu/ml | |
|---|---|---|---|---|
| 1 | — | Streptococcus | $4.7 \times 10^8$ | 76% |
| | | Lactobacillus | $1.5 \times 10^8$ | 24% |
| 2 | 0.1 | Streptococcus | $5.1 \times 10^8$ | 79% |
| | | Lactobacillus | $1.4 \times 10^8$ | 21% |
| 3 | 0.3 | Streptococcus | $6.4 \times 10^8$ | 89% |
| | | Lactobacillus | $0.8 \times 10^8$ | 21% |
| 4 | 1.0 | Streptococcus | $5.3 \times 10^8$ | 90% |
| | | Lactobacillus | $0.6 \times 10^8$ | 10% |
| 5 | 1.0* | Streptococcus | $5.0 \times 10^8$ | 85% |
| | | Lactobacillus | $0.9 \times 10^8$ | 15% |

* ATCC11454 was inoculated 2.5 hours after the start of fermentation.

Example 2

To 2 kg of a yogurt mix consisting of raw milk, powdered skim milk, and sugar were added 1.5% of commercially available *Streptococcus salivarius* subsp. *thermophilus* and 1.5% of low acid-producing *Lactobacillus delbrueckii* subsp. *bulgaricus* SBT 1511 (FERM BP-3762), followed by fermentation at 42° C. while stirring. 3–4 hours after the start of the fermentation, 0–5% of *Lactococcus lactis* subsp. *lactis* ATCC11454, and the fermentation was continued at 42° C. for 4 hours in total. Fermented milks were then stored at 10° C. to measure their acidity after 14 days. The antibacterial activity of ATCC11454 upon the inoculation was measured by the 96-well microplate method. Table 3 shows the number of living bacteria (colony forming unit: cfu) in yogurt when the 4 hour fermentation was completed and changes in acidity during the storage at 10° C. As the table indicates, in the lot to which 5% of ATCC11454 was inoculated growth of bacteria during 1 and 0.5 hour after the inoculation was controlled to 43% ($3.0 \times 10^8 / 7.0 \times 10^8$) and 61% ($4.9 \times 10^8 / 8.0 \times 10^8$), and the acidity increase in these lots was 61% and 81%, respectively, of the control lot to which no ATCC11454 was added. In the lot to which ATCC11454 was inoculated immediately after the 4 hour fermentation, the growth of bacteria was controlled to 80% ($6.7 \times 10^8 / 8.4 \times 10^8$) and the acidity increase was 83% of the control lot, respectively. The antibacterial activity of ATCC11454 bacterium on *Lactobacillus delbrueckii* subsp. *bulgaricus* SBT 1511 was 12.5 U/ml as converted to nisin.

TABLE 3

| ATCC11454 Inoculation Time: hour * | Inoculated ATCC11454 (%) | Number of bacteria Upon completion of fermentation (cfu/ml) | Acidity increase After 7 days | Acidity increase After 14 days |
|---|---|---|---|---|
| 3.0 | 0 | $7.0 \times 10^8$ | 0.276 (100%) | 0.331 (100%) |
| | 1 | $5.7 \times 10^8$ | 0.235 (85%) | 0.282 (85%) |
| | 2 | $4.9 \times 10^8$ | 0.230 (83%) | 0.278 (84%) |
| | 5 | $3.0 \times 10^8$ | 0.142 (51%) | 0.206 (62%) |
| 3.5 | 0 | $8.0 \times 10^8$ | 0.287 (100%) | 0.315 (100%) |
| | 1 | $7.0 \times 10^8$ | 0.276 (96%) | 0.323 (103%) |
| | 2 | $7.4 \times 10^8$ | 0.245 (85%) | 0.270 (86%) |
| | 5 | $4.9 \times 10^8$ | 0.203 (71%) | 0.256 (81%) |
| 4.0 | 0 | $8.4 \times 10^8$ | 0.282 (100%) | 0.324 (100%) |
| | 1 | $8.6 \times 10^8$ | 0.285 (101%) | 0.326 (101%) |
| | 2 | $6.7 \times 10^8$ | 0.263 (93%) | 0.314 (97%) |
| | 5 | $6.7 \times 10^8$ | 0.235 (83%) | 0.269 (83%) |

* Time (hours) when nisin-producing ATCC11454 was inoculated after the commencement of the fermentation.

Example 3

ATCC11454 bacterium was inoculated into Elliker medium with the composition shown in Table 4, in an amount of 1% of the medium, and fermented at 30° C. for 20 hours. Cells were separated by centrifugation at 5,000 rpm for 15 minutes, washed with physiological saline, and dispersed into an equivalent amount of a 12% reduced skim milk. Yogurt mixes were prepared by inoculating 1% of commercially available *Streptococcus salivarius* subsp. *thermophilus* and 1.5% of low acid-producing *Lactobacillus delbrueckii* subsp. *bulgaricus* SBT 1511 (FERM BP-3762), and further inoculating ATCC11454 bacterium in amounts of 0–5% as listed in Table 5. The mixes were fermented by allowing to stand still at 42° C. for 4 hours and stored at 10° C. After 14 days, the acidity of yoghult mixes was measured. The antibacterial activity of ATCC11454 upon completion of the fermentation was measured by the 96-well microplate method. The results are shown in Table 5.

TABLE 4

| Bacto Tryptone | 20 g/l |
|---|---|
| Bacto Yeast Extract | 5 |
| Bacto Gelatin | 2.5 |
| Bacto Dextrose | 5 |
| Bacto Lactose | 5 |
| Bacto Saccharose | 5 |
| Sodium Chloride | 4 |
| Sodium Acetate | 1.5 |
| Ascorbic Acid | 0.5 |

TABLE 5

| ATCC11454 (%) *1 | Number of living *2 bacteria (cfu/ml) | | Acidity (%) | | Acidity increase (%) | Antibacterial Activity (U/ml) *3 |
| --- | --- | --- | --- | --- | --- | --- |
| | Streptococcus | Lactobacillus | Upon fermentation | After 14 days | | |
| 0 | $6.7 \times 10^8$ | $3.1 \times 10^8$ | 0.888 | 1.328 | 0.443 (100%) | 0 |
| 0.5 | $6.3 \times 10^8$ | $2.3 \times 10^8$ | 0.850 | 1.255 | 0.404 (91%) | 0 |
| 1 | $6.5 \times 10^8$ | $2.2 \times 10^8$ | 0.838 | 1.239 | 0.401 (91%) | 0 |
| 2 | $6.5 \times 10^8$ | $1.4 \times 10^8$ | 0.800 | 1.129 | 0.329 (74%) | 2 |
| 5 | $6.5 \times 10^8$ | $0.4 \times 10^8$ | 0.600 | 0.893 | 0.291 (66%) | 2 |

*1 The amount of nisin-producing bacterium, ATCC11454.
*2 The number of bacteria upon completion of fermentation; 4 hours after the start of fermentation.
*3 Antibacterial activity against *Bacillus stearothermophilus*

As the table indicates, in the lot to which 5% of ATCC11454 was inoculated the number of cells of *Lactobacillus delbrueckii* subsp. *bulgaricus* SBT 1511 was controlled to 13% ($0.4\times10^8/3.1\times10^8$) of the control during the 4 hour fermentation and the acidity increase was 66% of the control. The antibacterial activity of the yogurt at the completion of the fermentation against *Bacillus stearothermophilus* was 2 U/ml. Here, the activity to suppress the growth of $10^6$ cells of *Bacillus stearothermophilus* is defined as 1 U/ml of the antibacterial activity.

As illustrated above, according to the present invention raw milk is fermented with the addition of a nisin-producing lactic acid bacteria belonging to genus *Lactococcus lactis* subsp. *lactis* together with starter bacteria, thus ensuring the production of nisin in the fermented milk. The nisin can effectively suppress the growth of lactic acid bacteria, especially of lactobaccili. As a result, the proportion of lactobaccili and lactococci in the fermented milk is kept at such a specific suitable ratio as to suppress the acid production during the storage and transportation. The fermented milk keeps its excellent quality without being deteriorated by the action of acids and the like.

Obviously, numerous modifications and variations of the present invention are possible in light of the above teachings. It is therefore to be understood that within the scope of the appended claims, the invention may be practiced otherwise than as specifically described herein.

What is claimed is:

1. A process for the manufacture of fermented milk with a controlled acidity increase during storage and transportation which comprises the steps of inoculating raw milk with a nisin producing lactic acid bacterium belonging to genus *Lactococcus lactis* subsp. *lactis* together with *Streptococcus salivarius* subsp. *thermophilus* and *Lactobacillus delbrueckii* subsp. *bulgaricus* SBT 1511 (FERM BP-3762); and fermenting said raw milk, said nisin-producing lactic acid bacterium producing nisin during said fermenting step and controlling the growth of said *Lactobacillus delbrueckii* subsp. *bulgaricus* and not affecting the growth of *Streptococcus salivarius* subsp. *thermophilus*.

2. The process of claim 1 wherein said *Lactococcus lactis* subsp. *lactis* is ATCC 11454.

* * * * *